3,317,567
DERIVATIVES OF TETRAHYDROFURAN
William J. Linn, Wilmington, Del., assignor to E. I. du Pont de Nemours and Company, Wilmington, Del., a corporation of Delaware
No Drawing. Filed Sept. 28, 1962, Ser. No. 227,070
12 Claims. (Cl. 260—346.1)

This invention relates to new heterocyclic compounds having a plurality of cyano substituents attached directly to the heterocyclic ring. More particularly it relates to polycyanotetrahydrofurans and a method for their preparation.

Tetrahydrofurans are ordinarily obtained by hydrogenation of corresponding unsaturated compounds (furans or dihydrofurans), or by oxide-forming ring closures of 1,4-diols or -halohydrins. Although many substituted tetrahydrofurans have been made by such methods, the substituted intermediates are often obtained with difficulty and the variety of survivable substituents is, in general, limited to those that can withstand the syntheses conditions. The number and diversity of potentially available tetrahydrofurans can be greatly increased through new methods of forming the basic ring structure.

The tetrahydrofurans of this invention are compounds which have a saturated ring of five atoms, consisting of four carbons and one oxygen and having at least one cyano group attached to each carbon adjacent to the oxygen, i.e., in the 2 and 5 positions, together with at least one additional substituent attached to a carbon adjacent to the oxygen.

The compounds of this class are adducts of (a) a polycyanoethylene oxide of the formula (I) 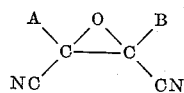

wherein A is hydrogen, cyano, R, RO(O)C—, $R_f$ or p-$XH_4C_6$—, where R is alkyl of 1–18 carbons, $R_f$ is polyfluoro R, and X is in the para position and is hydrogen, halogen, nitro, R or RO—; and B is cyano, —C(O)OR or $R_f$; and (b) a monomeric or polymeric compound of the formula (II) 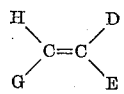

wherein each of D and G is hydrogen, halogen, hydrocarbyl, cyanohydrocarbyl or halohydrocarbyl in which all halogens are of atomic number 9–35; E is D (i.e., E is one of the groups within the definition of D but is not necessarily identical to the particular D group), cyano, —O(O)CR′, —C(O)OR′, —OR′ substituted hydrocarbyl, —O(O)CR′ substituted hydrocarbyl, —C(O)OR′ substituted hydrocarbyl (R′ being aliphatically saturated hydrocarbyl; i.e., any unsaturation is aromatic), or polyfluoroalkylthio; D and E conjointly are exomethylene (=$CH_2$); and E and G conjointly (—G—E—), together with the depicted carbons, form a cyclic compound in which any unsaturation is both intracyclic and ethylenic (C=C), the (—G—E—) segment of said compound being hydrocarbylene of 2–12 carbons (R″), halo R″ in which all halogens are of atomic number 9–35, oxyvinylene (—O—CH=CH), thiovinylene (—S—CH=CH—), or oxy(halovinylene) or thio(halovinylene) in which the halogen is of atomic number 17–35 (chlorine or bromine); with the proviso that at least one of D, E and G is hydrogen when the compound of Formula II is a monomer. Generally, when component (b) is a polymer D and G will be the same, and E will be a group within the definition of D.

The individual substituents A, B, D, E and G are monovalent; and the conjoined substituents, D and E, and E and G, are divalent. The term "hydrocarbyl" in the above definition is used in the usual sense to denote the monovalent radical obtained by removal of one hydrogen from a hydrocarbon; and correspondingly, the term "hydrocarbylene" is used to denote the divalent radical formed by removal of two hydrogens from a hydrocarbon. Examples of hydrocarbyl radicals which can be present as D, E or G are alkyl, aryl, alkynyl, cycloalkyl, aralkyl, arcycloalkyl, alkaryl, alkcycloalkyl, cycloalkylalkyl, cycloalkylaryl, alkenyl, cycloalkenyl and aralkynyl.

The monomeric products of this invention are adducts of at least one mole (usually 1–2 moles) of a polycyanoethylene oxide of Formula I and one mole of a monomeric compound of Formula II. The preferred monomeric adducts correspond to the formula (III) 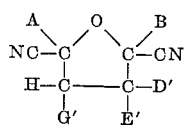

wherein at least one of D′, E′ and G′ is hydrogen; A and B are as defined above; each of D′ and G′ is hydrogen, halogen, R′ of up to 18 carbons, halo R′ of up to 18 carbons in which all halogens are of atomic number 9–35, or cyano R′ of up to 18 carbons; E′ contains up to 18 carbons and is D′, R‴ (R‴ being hydrocarbyl having one carbon-carbon double bond as its sole aliphatic unsaturation), halo R‴ in which all halogens are of atomic number 9–35, —C≡CR′, —C≡CH, cyano, —O(O)CR′, —CH₂O(O)CR′, —CH₂OR′, —C(O)OR′, —(CH₂)₁₋₈—C(O)OR′, —CH(loweralkoxy)₂, polyfluoroloweralkylthio ("lower" meaning 1 through 7 carbons), or (IV) 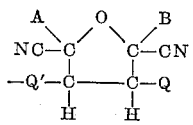

Q being hydrogen or lower alkyl and Q′ being lower alkylene; D′ and E′ conjointly are exomethylene (=$CH_2$); and E′ and G′ conjointly are the same as E and G conjointly as defined above.

Most preferred, because their precursors are more accessible, are the products of Formula III wherein each of A and B is cyano, and those adducts wherein D′, E′ and G′ have a combined total of up to 20 carbons.

The preferred polymeric products of this invention are the adducts of (a) a compound of Formula I, where A and B are as defined above, and (b) a polymer of Formula II which is free of acetylenic unsaturation and is an olefinic hydrocarbon, an olefinic halohydrocarbon in which all halogens are of atomic number 9–35, or an olefinic cyanohydrocarbon. Generally, the preferred polymeric adducts correspond to the formula:

(V) 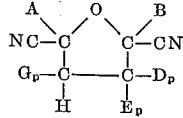

wherein A and B are as defined above; $D_p$ is $R_p$ ($R_p$ being a monovalent olefinic hydrocarbyl group bearing a plurality of divalent —(NC)(A)C—O—C(B)(CN)— radicals, the free valences of each such radical being bonded to adjacent carbons of the $R_p$ chain to form a tetrahydrofuran ring) or poly $X_p$-substituted $R_p$, the $X_p$ substituents being bonded to carbons of the hydrocarbyl group; $E_p$ is hydrogen or $X_p$, $X_p$ being halogen of atomic number 9–35 or cyano; and $G_p$ is the same as $D_p$, i.e., when $D_p$ is $R_p$, $G_p$ is $R_p$, etc. Particularly preferred are the polymeric adducts thus defined wherein A and B are cyano. Generally from about 3% to about 50% of the reactive carbon-carbon double bonds in the polymer precursor will react to form tetrahydrofuran rings.

The products of this invention are prepared by reacting a polycyanoethylene oxide of the formula (I) 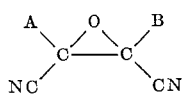

with a compound of the formula

II) 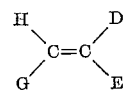

at a temperature of about 80° C. to about 250° C. The substituents A, B, D, E and G are as previously defined.

Polycyanoethylene oxides of the foregoing description can be obtained by procedures described in the copending, coassigned application Ser. No. 71,391, filed Nov. 25, 1960, now Patent Number 3,238,288. Among these polycyanoethylene oxides tetracyanoethylene oxide is especially preferred for the preparation of polycyanotetrahydrofurans because the olefin from which the oxide is prepared, i.e., tetracyanoethylene, is available commercially and is therefore more accessible than other polycyanoolefins. Because of their greater accessibility, $R_f$ groups containing up to 13 carbons each are preferred in epoxide starting materials having such substituents.

The preferred monomeric reactants are those which yield the compounds of Formula III, i.e., the monomeric reactants of Formula II wherein D, E and G are D′, E′ and G′, respectively, as defined above, with the obvious exception that E cannot be the E′ moiety of Formula IV. The preferred polymeric reactants are those which yield the products of Formula V.

The reaction takes place readily at temperatures in the range of about 80° C. to about 250° C., preferably at a temperature in the range of about 100° C. to about 200° C.

The reaction pressure is not critical and can be in the range from below to above atmospheric pressure. Accordingly, the reaction is accomplished in a reaction vessel suited to the chosen mode of operation. Although it is advantageous to carry out the reaction in a closed vessel under a pressure which may or may not be the autogenous pressure of the reactants, a reactor which is not closed pressurewise against the atmosphere can also be used. However, it is important to prevent escape of any reactant from the sphere of reaction, whether in a closed or open reaction vessel. When the vessel is otherwise open to the atmosphere, the reactants are confined by use of any suitable means, such as a solvent and/or a reflux condenser.

The reaction time is not critical and will ordinarily vary from about one hour to several days depending on the specific temperature and pressure that are employed, longer times being needed to obtain substantially complete reaction at lower temperatures and pressures.

A reaction medium is unnecessary but can be used to advantage; and the medium can be an excess of the unsaturated reactant, a non-reactive solvent such as 1,2-dibromoethane, or a potentially reactive solvent that is less reactive with polycyanoethylene epoxides than the chosen unsaturated reactant, e.g., toluene can be used as a solvent in the reaction of tetracyanoethylene oxide with styrene.

The proportions of polycyanoethylene epoxide and unsaturated reactant are not critical, and a stoichiometric excess of either can be used. Generally speaking, it is uneconomical to use a stoichiometric excess of the epoxide. However, it is not unusual to use an excess of the unsaturated reactant.

If the unsaturated reactant has more than one carbon-carbon aliphatic double bond, the bonds being cumulated or conjugated, only one of the double bonds will normally react with the epoxide even when the epoxide is present in stoichiometric excess. However, if the unsaturated reactant has two or more aliphatic double bonds that are not cumulated or conjugated, each of such double bonds can react simultaneously with separate molecules of the epoxide, e.g., unsaturated polymers such as polybutadiene can react at any or all of the separate unsaturated centers. Hence all non-cumulated and non-conjugated aliphatic bonds and one each of a series of cumulated or conjugated aliphatic double bonds in a polyunsaturated reactant are reactive. With a stoichiometrically equivalent or excess amount of epoxide reactant, calculated on the basis of one epoxide group to each such double bond, substantially all of the reactive aliphatic double bonds will be converted to polycyanotetrahydrofuran units. With an amount of epoxide reactant less than would be stoichiometrically equivalent to the reactive aliphatic double bonds in such a polyunsaturate, it is not possible to forecast accurately which specific double carbon-carbon bonds or what proportion of them in a given molecule would react. On a multi-molecular (i.e., gross) scale, the proportion of such double bonds that will react will generally approximate, in a statistical sense, the stoichiometric proportion of epoxide reactant; and the characteristics of different samples of products prepared by a given recipe will be generally the same.

If the unsaturated reactant contains acetylenic bonds ($-C\equiv C-$) and/or aromatic carbon-carbon double bonds in addition to aliphatic carbon-carbon double bonds, the latter which are not conjugated or cumulated with other aliphatic double bonds will react preferentially, followed by non-conjugated acetylenic bonds and then one bond of each series of aromatic double bonds if a sufficient excess of the epoxide is employed. When an acetylenic bond or an aromatic double bond is conjugated with an aliphatic double bond, only the aliphatic double bond will react. Similarly, when an aromatic bond is conjugated with an acetylenic bond, only the acetylenic bond will react. However, if polycyanoethylene oxide in excess of that required to react with all reactive aliphatic carbon-carbon double bonds is employed, reactive triple bonds or the reactive aromatic double bonds, as the case may be, can react to form tetrahydrofuran rings; and, if the excess is more than that required to react with all reactive acetylenic and aliphatic double bonds, the aromatic double bonds can also react, but only after reaction at such acetylenic and aliphatic double bonds is complete. Hence, where the reactant of Formula VI contains reactive acetylenic bonds and/or aromatic double bonds in addition to the depicted double bond, the extent to which such acetylenic and aromatic bonds do react can be controlled by maintaining the appropriate mole ratio of epoxide to reactive bond. Reaction at sites of acetylenic and aromatic unsaturation can be prevented by using no more than about one mole of polycyanoethylene oxide per reactive aliphatic carbon-carbon double bond.

The non-polymeric compounds of the invention are usually crystalline and can be isolated and purified by well-known methods of filtration and crystallization. The polymeric products will vary in physical properties according to the nature of the original polyunsaturated polymer and the extent to which the reactive double bonds are converted to polycyanotetrahydrofuran units. Generally, such products are higher melting and less soluble than the parent polymers.

As was noted above, the epoxide reactants used in the process of this invention are prepared by the method disclosed and claimed in application Ser. No. 71,391 now Patent No. 3,238,288. This method consists of reacting a compound of the formula

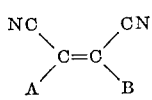

wherein A and B are as defined above, with aqueous hydrogen peroxide (at least 3% $H_2O_2$ by weight, conveniently 30% by weight) in solution in a single phase, preferably at a temperature of −20 to +50° C. and a pH of 6–8. The solvent used to prepare the single phase solution of reactants is a water-miscible, inert organic liquid such as acetonitrile. A typical preparation is as follows:

A solution of 256 parts of tetracyanoethylene in 1180 parts of acetonitrile is cooled at 0° C. and 344 parts of 30% hydrogen peroxide is added all at once. A transient violet color appears which soon fades to yellow. The solution is stirred for five minutes and diluted with 10,000 parts of ice water. The oil which separates soon solidifies and is collected by filtration and dried to give 200 parts (70% yield) of colorless crystals of tetracyanoethylene oxide. After recrystallization from ethylene dichloride, the product melts at 177–178° C.

The invention is illustrated in greater detail in the following examples, in which quantities of reactants (parts) are given in terms of weight.

EXAMPLE I

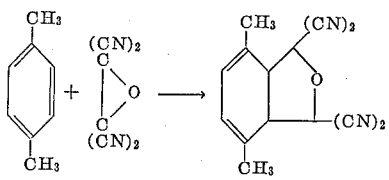

A suspension of 5.0 parts of tetracyanoethylene oxide in 43 parts of p-xylene was stirred and heated to reflux for 17 hours. The reaction mixture was cooled to room temperature, and the mass of brown crystals which separated was collected by filtration. There was obtained 5.81 parts of solid, which was recrystallized from n-butanol to give 3.55 parts of colorless crystals of 4,7-dimethyl-1,1,3,3-tetracyano-1,3,3a,7a-tetrahydroisobenzofuran, M.P., 220–221° C.

*Analysis.*—Calc'd for $C_{14}H_{10}N_4O$: C, 67.2; H, 4.1; N, 22.4. Found: C, 67.1; H, 4.0; N, 21.8.

The structure of this product was established by infrared, ultraviolet and nuclear magnetic resonance spectral data, together with the elemental analysis.

EXAMPLE II

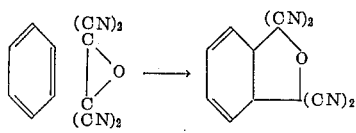

A mixture of 10.0 parts of tetracyanoethylene oxide and 88 parts of benzene was heated in a sealed vessel for 16 hours at 150° C. The crude reaction mixture, which was a semi-solid, was separated by filtration and the solid portion was washed with benzene. The solvent was removed by distillation to give another solid residue. The solid products were combined and recrystallized from absolute ethanol to give 4.73 parts of straw-colored crystals of 1,1,3,3-tetracyano-1,3,3a,7a-tetrahydroisobenzofuran, M.P., 159–164° C. Repeated recrystallization of the product raised its melting point to 167–168° C.

*Analysis.*—Calc'd for $C_{12}H_6N_4O$: C, 64.8; H, 2.7; N, 25.2; M.W., 222. Found: C, 64.9; H, 2.9; N, 24.7, 24.7; M.W., 238, 228.

The structure of this product was further established by means of infrared and ultraviolet spectral data.

EXAMPLE III

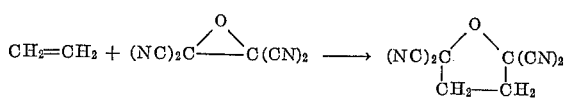

A suspension of 15 parts of tetracyanoethylene oxide in 188 parts of 1,2-dichloroethane was sealed in a pressure vessel and pressured with ethylene to 950 atmospheres. The vessel was shaken and heated to 150° C. for 10 hours. The recovered solution was evaporated to dryness to give 15.1 parts of pale tan solid, which was recrystallized from benzene to give 10.5 parts of 2,2,5,5-tetracyanotetrahydrofuran, M.P., 106–108° C. Further recrystallization of the product from benzene raised its melting point to 107–108.5° C.

*Analysis.*—Calc'd. for $C_8H_4N_4O$: C, 55.8; H, 2.3; N, 32.6; M.W., 172. Found: C, 56.0; H, 2.5; N, 32.5, 32.9; M.W., 183, 186.

The structure of this product was established by spectral data, and by its hydrolysis with decarboxylation to the known cis-tetrahydrofuran-2,5-dicarboxylic acid.

EXAMPLE IV

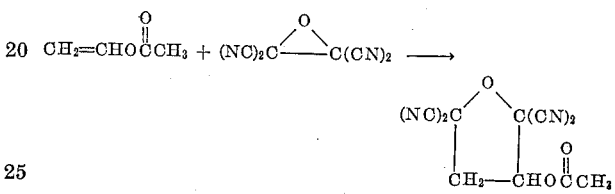

A mixture of 24 parts of vinyl acetate, 20 parts of tetracyanoethylene oxide, and 188 parts of 1,2-dichloroethane was heated in a pressure vessel for 16 hours at 130° C. The recovered reaction mixture was concentrated by evaporation, and the residual dark viscous oil was flash distilled to give a pale yellow viscous liquid which soon solidified. There was obtained 23.4 parts of pale tan solid, M.P., 86–88° C. Recrystallization of the solid from benzene gave 21.2 parts (66%) of large rhombs of 3-acetoxy-2,2,5,5-tetracyanotetrahydrofuran, M.P., 87.5–88.5° C. Further recrystallization from benzene raised the melting point of the product to 88.5–89° C.

*Analysis.*—Calc'd. for $C_{10}H_6N_4O$: C, 52.2; H, 2.6; N, 24.3. Found: C, 52.7; H, 2.9; N, 24.4.

EXAMPLE V

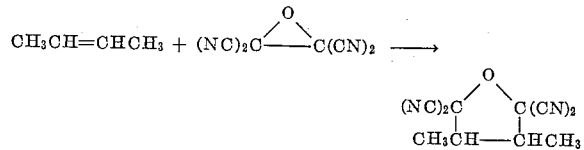

A. A mixture of 20 parts of tetracyanoethylene oxide, 16 parts of trans-2-butene, and 188 parts of 1,2-dichloroethane was heated in a sealed pressure vessel for 16 hours at 130° C. The recovered solution was concentrated by evaporation, and the dark solid residue was recrystallized from benzene to give 18 parts of dark crystalline product. This was further purified by sublimation to give 14 parts of pale yellow crystals, which upon further recrystallization from benzene melted at 105–106° C. Another recrystallization from benzene gave 7.5 parts of colorless crystals of trans-3,4-dimethyl-2,2,5,5-tetracyanotetrahydrofuran, M.P., 108–109° C.

*Analysis.*—Calc'd. for $C_{10}H_8N_4O$: C, 60.0; H, 4.0; N, 28.0. Found: C, 60.2; H, 4.1; N, 28.3.

B. A mixture of 15 parts of tetracyanoethylene oxide, 12 parts of cis-2-butene and 135 parts of ethyl acetate was sealed in a pressure vessel and heated for 16 hours at 130° C. The reaction mixture was concentrated by evaporation to give a dark solid which was sublimed at 120° C./0.2 mm. In this manner there was recovered 11.5 parts of pale yellow needles which were recrystallized from benzene to give 7.8 parts of colorless needles of cis-3,4-dimethyl-2,2,5,5-tetracyanotetrahydrofuran, M.P., 123–125° C.

*Analysis.*—Calc'd. for $C_{10}H_8N_4O$: C, 60.0; H, 4.0; N, 28.0. Found: C, 60.4; H, 4.1; N, 28.2.

EXAMPLE VI

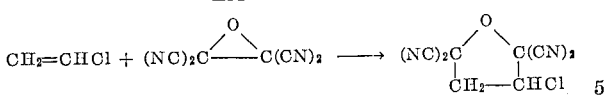

A mixture of 15 parts of tetracyanoethylene oxide, 13 parts of vinyl chloride, and 188 parts of 1,2-dichloroethane was sealed in a pressure vessel and heated for 16 hours at 130° C. The recovered reaction mixture was concentrated by distillation to give 20.0 parts of light brown solid, which was recrystallized from a mixture of benzene and hexane to give 17.9 parts of 3-chloro-2,2,5,5-tetracyanotetrahydrofuran, M.P., 118.5–120° C.

*Analysis.*—Calc'd. for $C_7H_3ClN_4O$: C, 46.5; H, 1.5; N, 27.1; Cl, 17.2. Found: C, 46.3; H, 1.3; N, 26.8, 26.8; Cl, 17.2.

EXAMPLE VII

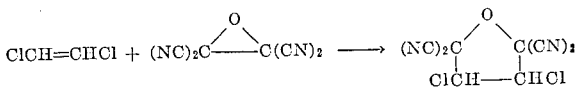

A mixture of 15 parts of tetracyanoethylene oxide, 20 parts of trans-1,2-dichloroethylene, and 188 parts of 1,2-dichloroethane was sealed in a pressure vessel and heated for 16 hours at 150° C. The recovered reaction mixture was concentrated by evaporation to leave a brown solid, which was recrystallized from 1,2-dichloroethane to give 15.6 parts (67%) of light tan crystals of 3,4-dichloro-2,2,5,5-tetracyanotetrahydrofuran, M.P., 146–148° C.

*Analysis.*—Calc'd. for $C_8H_2Cl_2N_4O$: C, 39.9; H, 0.84; Cl, 29.4. Found: C, 40.0; H, 1.00; Cl, 29.7.

EXAMPLE VIII

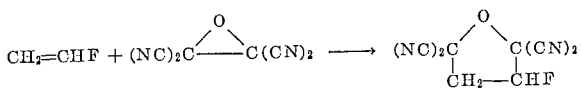

A mixture of 10 parts of tetracyanoethylene oxide, 12 parts of vinyl fluoride, and 188 parts of 1,2-dichloroethane was sealed in a stainless steel pressure vessel and heated for 16 hours at 150° C. The reaction mixture was filtered to remove some dark colored by-products, and the filtrate was concentrated by evaporation to give 11.7 parts of pale tan powder, which was recrystallized from 1,2-dichloroethane to give 9.2 parts (76%) of light tan crystals of 3-fluoro-2,2,5,5-tetracyanotetrahydrofuran, M.P., 134–135° C. Further recrystallization of the product from 1,2-dichloroethane raised the melting point to 135–135.5° C.

*Analysis.*—Cal'cd. for $C_8H_3FN_4O$: C, 50.5; H, 1.6; F, 10.0. Found: C, 51.1, 50.8; H, 1.8, 1.9; F, 10.2.

EXAMPLE IX

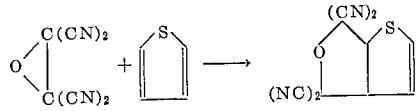

A mixture of 15 parts of tetracyanoethylene oxide, 26 parts of thiophene and 188 parts of 1,2-dichloroethane was sealed in a pressure vessel and heated for 16 hours at 130° C The reaction mixture was filtered to remove a trace of suspended dark solid, which was discarded. Evaporative concentration of the filtrate left a dark crystalline solid which was recrystallized from benzene, with use of charcoal for decolorization. In this manner there was obtained 11.8 parts of yellow needles, M.P., 158–162° C. For further purification the product was recrystallized from 1,2-dichloroethane and sublimed to give colorless crystals of 4,4,6,6-tetracyano-3a,4,6,6a-tetrahydrothieno[2,3-c]furan, M.P., 159–160° C.

*Analysis.*—Calc'd. for $C_{10}H_4N_4SO$: C, 52.6; H, 1.8; S, 14.0. Found: C, 53.4; H, 2.2; S, 14.4.

EXAMPLE X

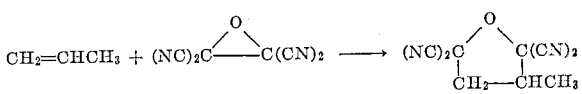

A mixture of 15 parts of tetracyanoethylene oxide, 13 parts of propylene and 188 parts of 1,2-dichloroethane was heated in a pressure vessel for 10 hours at 130° C. The reaction mixture was concentrated by evaporation to leave a brown solid, which was dissolved in boiling benzene, treated with charcoal and filtered. Petroleum ether was added to the filtrate to precipitate 10.7 parts of tan crystals of 3-methyl-2,2,5,5-tetracyanotetrahydrofuran, M.P., 78–79° C.

*Analysis.*—Calc'd. for $C_9H_6N_4O$: C, 58.1; H, 3.2; N, 30.1. Found: C, 58.1; H, 3.3; N, 30.2.

EXAMPLE XI

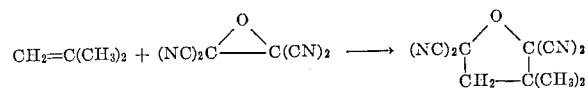

A mixture of 15 parts of tetracyanoethylene oxide, 17 parts of isobutylene and 188 parts of 1,2-dichloroethane was heated in a pressure vessel for 10 hours at 130° C. The reaction mixture was filtered to give 4.6 parts of black solid, which was discarded. Evaporative concentration of the filtrate left a dark residue, which was flash distilled to give a viscous yellow oil which partially crystallized. This was treated with a mixture of ether and petroleum ether and filtered to obtain 2.4 parts of pale yellow solid which was recrystallized from benzene to give 2.2 parts of 3,3-dimethyl-2,2,5,5-tetracyanotetrahydrofuran, M.P., 130–131° C.

*Analysis.*—Calc'd. for $C_{10}H_8N_4O$: C, 60.0; H, 4.0; N, 28.0. Found: C, 59.5; H, 4.1; N, 28.0.

EXAMPLE XII

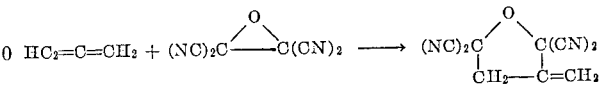

A mixture of 15 parts of tetracyanoethylene oxide, 16 parts of allene, and 188 parts of 1,2-dichloroethane was heated in a pressure vessel for 10 hours at 130° C. The reaction mixture was concentrated by evaporation to leave a tan solid, which was recrystallized from benzene to give 10.4 parts of pale yellow crystals, M.P., 114–116° C. Concentration of the mother liquors gave an additional 4.39 parts of pale yellow solid, M.P., 105–114° C. Further purification of the first crop of solid gave colorless crystals of 3-methylene-2,2,5,5-tetracyanotetrahydrofuran, M.P., 116.5–117.5° C.

*Analysis.*—Calc'd. for $C_9H_4N_4O$: C, 58.7; H, 2.2; N, 30.4; M.W., 184. Found: C, 58.2; H, 2.4; N, 30.2; M.W., 189, 185

EXAMPLE XIII

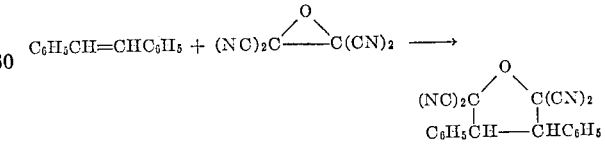

A. A mixture of 5.0 parts of tetracyanoethylene oxide, 6.25 parts of trans-stilbene, and 109 parts of 1,2-dibromoethane was heated to reflux for 4.5 hours. The reaction mixture was cooled, and the crystalline solid which precipitated was collected by filtration to give 9.5 parts of tan crystals. Recrystallization of the product from 1,2-dichloroethane yielded 7.2 parts of colorless needles of trans - 3,4 - diphenyl-2,2,5,5-tetracyanotetrahydrofuran, M.P., 257–259° C.

*Analysis.*—Calc'd. for $C_{20}H_{12}N_4O$: C, 74.1; H, 3.7; N, 17.3. Found: C, 74.1; H, 3.8; N, 17.2.

B. A mixture of 5.0 parts of tetracyanoethylene oxide and 6.25 parts of cis-stilbene in 86.6 parts of toluene was heated to reflux for 5.5 hours. The reaction mixture was cooled to room temperature and the solvent was removed under reduced pressure. The brown solid residue was recrystallized from n-propanol to give 5.8 parts (52%) of colorless crystals of cis-3,4-diphenyl-2,2,5,5-tetracyanotetahydrofuran, M.P., 184–186° C. Repeated recrystallization raised the melting point of the product to 187–189° C.

*Analysis*—Calc'd: for $C_{20}H_{12}N_4O$: C, 74.1; H, 3.1; N, 17.3. Found: C, 73.6; H, 3.9; N, 17.0.

EXAMPLE XIV

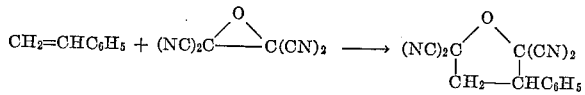

A mixture of 5.0 parts of tetracyanoethylene oxide, 7.2 parts of styrene, and 86.6 parts of toluene was heated to reflux for 6 hours. The reaction mixture was evaporated to dryness; and the residue was taken up in boiling benzene, treated with charcoal, filtered, and cooled. There was obtained a precipitate of 4.3 parts (50%) of pale tan crystals of 3-phenyl-2,2,5,5-tetracyanotetrahydrofuran, M.P., 145–147.5° C. Further recrystallization of the product raised the melting point to 147–148° C.

*Analysis*—Calc'd: for $C_{14}H_8N_4O$: C, 67.7; H, 3.2; N, 22.6. Found: C, 67.8; H, 3.5; N, 22.4.

EXAMPLE XV

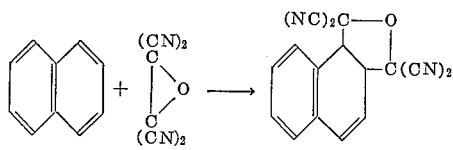

A mixture of 5.0 parts of tetracyanoethylene oxide, 4.45 parts of naphthalene and 109 parts of 1,2-dibromoethane was heated to reflux for 4 hours and 45 minutes. The reaction mixture was evaporated to dryness and the solid residue was washed with ether. In this manner there was obtained 7.7 parts of pale tan crystals, which were recrystallized from benzene to give 6.9 parts (73%) of pale yellow crystals of 1,1,3,3-tetracyano-1,3,3a,9b-tetrahydronaphtho-[1,2-c]furan, M.P., 173–174° C.

*Analysis*—Calc'd: for $C_{16}H_8N_4O$: C, 70.5; H, 3.0; N, 20.6. Found: C, 71.2; H, 3.3; N, 20.4.

EXAMPLE XVI

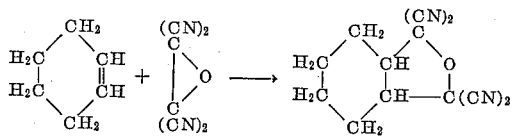

A mixture of 5 parts of tetracyanoethylene oxide, 5.7 parts of cyclohexene and 87 parts of 1,2-dibromoethane was heated to reflux for 2 hours. The reaction mixture was cooled and filtered. The filtrate was concentrated by evaporation leaving a dark residue which was sublimed to give 1.92 parts of tan crystals which were recrystallized from benzene to give colorless crystals of 1,1,3,3 - tetracyano - 1,3,3a,4,5,6,7,7a - octahydroisobenzofuran, M.P., 118–119° C.

*Analysis*—Calc'd: for $C_{12}H_{10}N_4O$: C, 63.7; H, 4.5; N, 24.8. Found: C, 63.9; H, 4.7; N, 24.9, 24.7.

EXAMPLE XVII

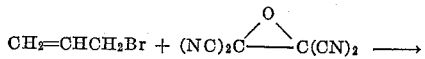

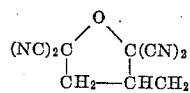

A suspension of 5.0 parts of tetracyanoethylene oxide and 8.5 parts of allyl bromide in 85 parts of 1-chloro-2-bromoethane was refluxed for 17 hours. The reaction mixture was cooled, and the crystalline solid which precipitated was collected by filtration to give 6.5 parts (71%) of 3 - (bromomethyl) - 2,2,5,5 - tetracyanotetrahydrofuran, M.P. 141–143° C. For analysis, the product was recrystallized from benzene.

*Analysis*—Calc'd: for $C_9H_5BrN_4O$: C, 40.7; H, 1.9; N, 21.1. Found: C, 40.3; H, 2.2; N, 21.6, 21.4.

EXAMPLE XVIII

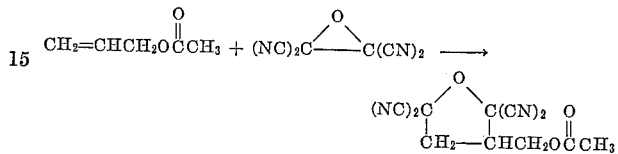

A mixture of 5.0 parts of tetracyanoethylene oxide and 7.0 parts of allyl acetate in 85 parts of 1-chloro-2-bromoethane was refluxed for 18 hours. The reaction mixture was evaporated to dryness to leave a dark oil which soon crystallized. This residue was recrystallized from benzene to give 5.33 parts (63%) of 3-(acetoxymethyl) - 2,2,5,5 - tetracyanotetrahydrofuran, M.P. 96–99° C. After recrystallization from isopropanol, the product melts at 97.5–98° C.

*Analysis*—Calc'd: for $C_{11}C_8N_4O$: C, 54.0; H, 3.30; N, 22.9. Found: C, 53.8; H, 3.29; N, 22.8, 23.0.

EXAMPLE XIX

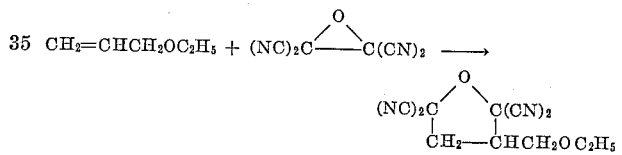

A mixture of 5.0 parts of tetracyanoethylene oxide and 6.0 parts of allyl ethyl ether in 85 parts of 1-chloro-2-bromoethane was refluxed for 23 hours. The reaction mixture was cooled to room temperature and filtered. There was collected 3.9 parts of crystalline solid. Evaporation of the filtrate gave an additional 3.0 parts of the same solid. These two crops were combined and recrystallized from benzene to give 5.15 parts of 3-(ethoxymethyl)-2,2,5,5,-tetracyanotetrahydrofuran, M.P. 109–110°C. After recrystallization from benzene the product melts at 109.5–110° C.

*Analysis*—Calc'd: for $C_{11}H_{10}N_4O$: C, 57.4; H, 4.4; N, 24.3. Found: C, 57.3; H, 4.5, N, 24.3, 24.0.

EXAMPLE XX

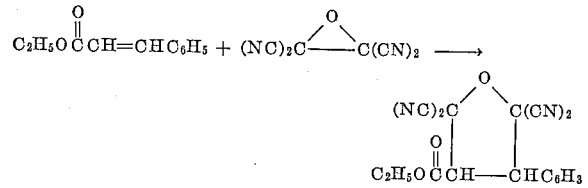

A suspension of 6.10 parts of ethyl cinnamate and 5.00 parts of tetracyanoethylene oxide in 109 parts of 1,2-dibromoethane was refluxed for three hours. The reaction mixture was evaporated, leaving a brown solid which was recrystallized from carbon tetrachloride to give 9.45 parts of ethyl 3-phenyl-2,2,5,5-tetracyanotetrahydro-4-furoate, M.P. 106–107° C. Recrystallization of the product from carbon tetrachloride raised the melting point to 117–118° C.

*Analysis*—Calc'd. for $C_{17}H_{12}N_4O$: C, 63.8; H, 3.8; N, 17.5. Found: C, 63.9; H, 4.0; N, 17.7.

EXAMPLE XXI

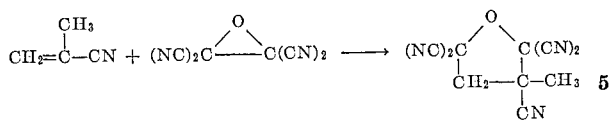

A mixture of 5.0 parts of tetracyanoethylene oxide and 4.8 parts of methacrylonitrile in 109 parts of 1,2-dibromoethane was refluxed for 16 hours. The reaction mixture was cooled, and the insoluble precipitate was collected by filtration to give 3.68 parts of crude 3-methyl-2,2,3,5,5-pentacyanotetrahydrofuran. Evaporation of the filtrate gave an additional 2.98 parts of light tan solid which also contained some of the product which was contaminated with starting material. The first crop of crystals was recrystallized from benzene to give 2.87 parts, melting point 129–130° C.

*Analysis.*—Calc'd. for $C_{10}H_5N_5O$: C, 56.9; H, 2.4; N, 33.2. Found: C, 56.8; H, 2.4; N, 33.1, 33.4.

EXAMPLE XXII

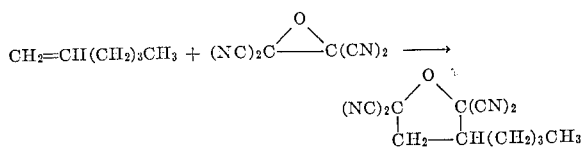

A mixture of 5.0 parts of tetracyanoethylene oxide and 3.0 parts of 1-hexene in 85 parts of 1-chlorobromoethane was heated to reflux for 17 hours. The reaction mixture was evaporated to leave a viscous oil which was distilled in a short-path evaporative still to give 5.35 parts (64.5%) of pale yellow liquid, distilling at a block temperature of 90–100° C. at 0.1 mm. The product was redistilled to obtain a pure sample of 3-(n-butyl)-2,2,5,5-tetracyanotetrahydrofuran.

*Analysis.*—Calc'd. for $C_{12}H_{12}N_4O$: C, 63.2; H, 5.3; N, 24.6. Found: C, 63.8, 63.7; H, 5.4, 5.5; N, 25.5, 25.6.

EXAMPLE XXIII

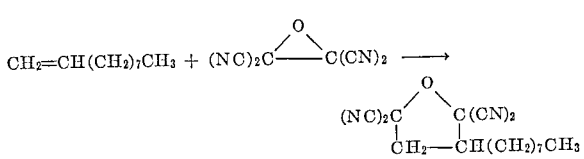

A mixture of 5.0 parts of tetracyanoethylene oxide and 5.0 parts of 1-decene in 85 parts of 1-chloro-2-bromoethane was heated to reflux for 6.5 hours. The reaction mixture was evaporated to dryness, leaving a dark solid mixture which was taken up in petroleum ether. Benzene was added until there was a definite solid phase which was separated by filtration. The filtrate was evaporated, and the residue was distilled in a short-path still at a block temperature of 150–160° C. at 0.2 mm. to give a total of 5.7 parts (56.5%) of 3-(n-octyl)-2,2,5,5-tetracyanotetrahydrofuran.

*Analysis.*—Calc'd. for $C_{16}H_{20}N_4O$: C, 67.6; H, 7.1; N, 19.7. Found: C, 67.1; H, 7.2; N, 19.8.

EXAMPLE XXIV

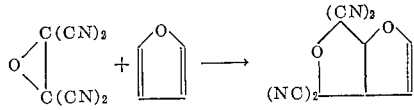

A mixture of 15 parts of tetracyanoethylene oxide, 23.4 parts of furan, and 178 parts of 1,2-dichloroethane was heated in a sealed pressure vessel to 150° C. for 16 hours. The reaction mixture was filtered to remove the suspended black solid, and the filtrate was evaporated. The residue was sublimed to give 2.0 parts of red-brown crystals which were recrystallized from 1,2-dichloroethane to give 1.10 parts of colorless crystals of 4,4,6,6- tetracyano - 3a,4,6,6a - tetrahydrofuro[3,4-b]furan, M.P. 161–162° C.

*Analysis.*—Calc'd. for $C_{10}H_4N_4O_2$: C, 56.6; H, 1.89; N, 26.4. Found: C, 56.0; H, 1.95; N, 26.1, 26.5.

EXAMPLE XXV

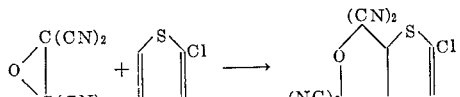

A mixture of 5.0 parts of tetracyanoethylene oxide and 11.9 parts of 2-chlorothiophene in 109 parts of 1,2-dibromoethane was refluxed for 16 hours. The reaction mixture was cooled to room temperature, and the insoluble solid was collected by filtration. The solid was recrystallized from 1,2-dichloroethane to give 3.72 parts (48%) of colorless crystals of 2-chloro-4,4,6,6-tetracyano-3a,4,6,6a-tetrahydrothieno[2,3-c]furan, M.P. 178–179° C. Recrystallization of the product from 1,2-dichloroethane raised the melting point to 179–180° C.

*Analysis.*—Calc'd. for $C_{10}H_3ClN_4OS$: C, 45.7; H, 1.15; N, 21.3. Found: C, 45.1; H, 1.12; N, 21.6, 21.2.

EXAMPLE XXVI

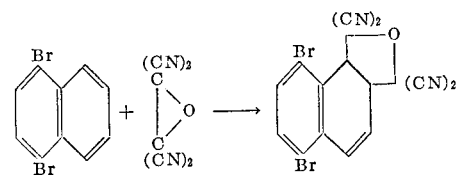

A mixture of 5.0 parts of tetracyanoethylene oxide and 9.93 parts of 1,4-dibromonapthalene in 218 parts of 1,2-dibromoethane was refluxed for 26.5 hours. The reaction mixture was cooled, and the insoluble solid was collected by filtration. The filtrate was evaporated to dryness, and the residue was treated with diethyl ether and filtered to remove unchanged 1,4-dibromonapthalene. The insoluble fraction was recrystallized from 1,2-dichloroethane to give 6.08 parts (52.5%) of dense crystals of 6,9-dibromo-1,1,3,3 - tetracyano - 1,3,3a,9b-tetrahydronaphtho[1,2-c]furan, M.P. 196–198° C. Another recrystallization of the product from ethylene dichloride raised the melting point to 202–203° C.

*Analysis.*—Calc'd for $C_{16}H_6Br_2N_4O$: C, 44.7; H, 1.41; N, 13.0. Found: C, 45.1; H, 1.67; N, 13.0, 13.1.

EXAMPLE XXVII

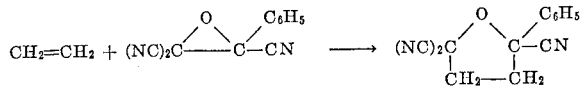

A mixture of 4.0 parts of phenyltricyanoethylene oxide and 17.8 parts of 1,2-dichloroethane was sealed into a stainless steel-lined pressure vessel and pressured with ethylene. The reaction vessel was shaken for 10 hours at 150° C. under an ethylene pressure of 2500 lbs./in.² The recovered reaction solution was concentrated to leave a viscous oil, which was distilled in a short path distilling apparatus at 115° C. and 0.1 mm. The distillate solidified and was recrystallized from a mixture containing equal volumes of ether and low-boiling petroleum ether. There was obtained 3.25 parts (71%) of crystalline 2-phenyl-2,5,5-tricyanotetrahydrofuran, M.P. 50–51° C. The melting point was not changed by further recrystallization of the product.

*Analysis.*—Calc'd for $C_{13}H_9N_3O$: C, 70.0; H, 4.06; N, 18.8. Found: C, 70.5; H, 4.12; N, 19.1, 19.2.

Additional examples of monomeric compounds containing carbon-carbon double bonds that will react with tetracyanoethylene epoxide under the conditions described hereinabove, and the corresponding polycyanotetrahydrofuran products, are presented in Table I.

TABLE I

| Unsaturated Reactant | Epoxide Reactant | Product |
|---|---|---|
| CH₃(CH₂)₇CH=CHCH₃ | (NC)₂C—C(CN)₂ with O bridge | 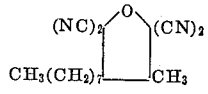 3-methyl-4-(n-octyl)-2,2,5,5-tetracyanotetrahydrofuran |
| CH₂=CH(CH₂)₁₅CH₃ | (NC)₂C—C(CN)₂ with O bridge | 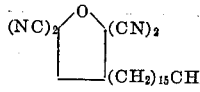 3-(n-hexadecyl)-2,2,5,5-tetracyanotetrahydrofuran |
| 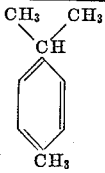 | (NC)₂C—C(CN)₂ with O bridge | 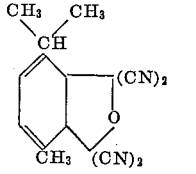 4-methyl-7-isopropyl-1,1,3,3-tetracyano-1,3,3a,7a-tetrahydroisobenzofuran |
| 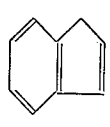 | (NC)₂C—C(CN)₂ with O bridge | 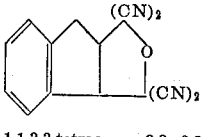 1,1,3,3-tetracyano-3,3a,8,8a-tetrahydro-1H-indeno[1,2-c]furan |
| 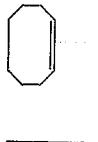 | (NC)₂C—C(CN)₂ with O bridge | 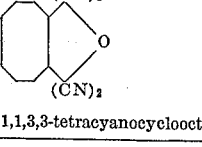 1,1,3,3-tetracyanocycloocta[c]furan |
| 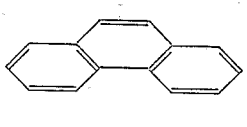 | (NC)₂C—C(CN)₂ with O bridge | 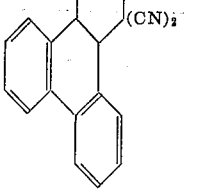 1,1,3,3-tetracyano-1,3,3a,11b-tetrahydrophenanthro[9,19-c]furan |
| CH₂=CH(CH₂)₂CH=CH₂ | (NC)₂C—C(CN)₂ with O bridge | 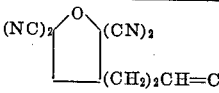 3-(3-butenyl)-2,2,5,5-tetracyanotetrahydrofuran (1:1 adduct) |
| CH₂=CH(CH₂)₂CH=CH₂ | (NC)₂C—C(CN)₂ with O bridge | 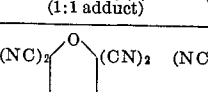 3,3'-ethylenebis(2,2,5,5-tetracyanotetrahydrofuran) (1:2 adduct) |
| CH₂=CHOC(O)C(CH₃)₃ | (NC)₂C—C(CN)₂ with O bridge | 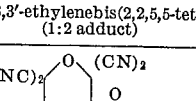 3-pivaloyloxy-2,2,5,5-tetracyanotetrahydrofuran |
| CH₂=CHOC(O)(CH₂)₁₆CH₃ | (NC)₂C—C(CN)₂ with O bridge | 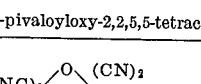 3-stearoyloxy-2,2,5,5-tetracyanotetrahydrofuran |

TABLE I—Continued

| Unsaturated Reactant | Epoxide Reactant | Product |
|---|---|---|
| CH$_2$=CHOCOC$_6$H$_5$ | (NC)$_2$C—C(CN)$_2$ (epoxide) | 3-benzoyloxy-2,2,5,5-tetracyanotetrahydrofuran |
| cyclohexenyl acetate | (NC)$_2$C—C(CN)$_2$ | 3a-acetoxy-1,1,3,3-tetracyano-1,3,3a,4,5,6,7,7a-octahydroisobenzofuran |
| cyclobutene | (NC)$_2$C—C(CN)$_2$ | 1,1,3,3-tetracyanocyclobuta[c]furan |
| CH$_2$=CHCOCH$_2$C$_6$H$_5$ | (NC)$_2$C—C(CN)$_2$ | Benzyl 2,2,5,5-tetracyanotetrahydro-3-furoate |
| CH$_2$=C(CH$_3$)COO(CH$_2$)$_{11}$CH$_3$ | (NC)$_2$C—C(CN)$_2$ | n-Dodecyl 3-methyl-2,2,5,5-tetracyanotetrahydro-3-furoate |
| 1,4-dichlorobenzene | (NC)$_2$C—C(CN)$_2$ | 4,7-dichloro-1,1,3,3-tetracyano-1,3,3a,7a-tetrahydroisobenzofuran |
| 1,5-diethylnaphthalene | (NC)$_2$C—C(CN)$_2$ | 1,1,3,3-tetracyano-6,9-diethyl-1,3,3a,9b-tetrahydronaphtho[1,2-c]furan |
| CH$_2$=CH$_2$ | (NC)$_2$C—C(CN)(CH$_2$)$_8$CH$_3$ | 2-(n-nonyl)-2,5,5-tricyanotetrahydrofuran |
| CH$_2$=CH$_2$ | (NC)$_2$C—C(CN)(CH$_2$)$_{16}$CH$_3$ | 2-(n-heptadecyl)-2,5,5-tricyanotetrahydrofuran |

TABLE I—Continued

| Unsaturated Reactant | Epoxide Reactant | Product |
|---|---|---|
| $CH_2=CH_2$ | (NC)$_2$C—C(CN)(C$_6$H$_4$-C(CH$_3$)$_3$) epoxide | 2-(p-[t-butyl]phenyl)-2,5,5-tricyanotetrahydrofuran |
| $CH_2=CH_2$ | (NC)$_2$C—C(CN)(C$_6$H$_4$-(CH$_2$)$_{17}$CH$_3$) epoxide | 2-(p-[n-heptadecyl]phenyl-2,5,5-tricyanotetrahydrofuran |
| $CH_2=CH_2$ | (NC)$_2$C—C(CN)(C$_6$H$_4$-OCH$_3$) epoxide | 2-(p-ethoxyphenyl)-2,5,5-tricyanotetrahydrofuran |
| $CH_2=CH_2$ | (NC)$_2$C—C(CN)(C$_6$H$_4$-O(CH$_2$)$_{15}$CH$_3$) epoxide | 2-(p-[n-hexadecyl]phenyl)-2,5,5-tricyanotetrahydrofuran |
| $CH_2=CH_2$ | (NC)$_2$C—C(CN)(C$_6$H$_4$-Br) epoxide | 2-(p-bromophenyl)-2,5,5-tricyanotetrahydrofuran |
| $CH_2=CH_2$ | (NC)$_2$C—C(CN)(C$_6$H$_4$-NO$_2$) epoxide | 2-(p-nitrophenyl)-2,5,5-tricyanotetrahydrofuran |
| benzene | (NC)$_2$C—C(CN)(COOC$_2$H$_5$) epoxide | Ethyl 1,1,3-tricyano-1,3,3a,7a-tetrahydroisobenzo-3-furoate |
| $CH_3CH=CHCH_3$ | NCCH—C(CN)(COO(CH$_2$)$_{11}$CH$_3$) epoxide | n-Dodecyl 2,5-dicyano-3,4-dimethyltetrahydro-2-furoate |
| $CH_2=CH_2$ | CH$_3$(CH$_2$)$_5$OC(O)C(CN)—C(CN)((CH$_2$)$_5$CH$_3$) epoxide | n-Hexyl 2,5-dicyano-2-(n-hexyl)tetrahydro-5-furoate |

TABLE I—Continued

| Unsaturated Reactant | Epoxide Reactant | Product |
|---|---|---|
| $CH_2=CH_2$ | $CH_3O\overset{O}{\underset{CN}{C}}\overset{O}{-}\underset{CN}{C}(CH_2)_{15}CH_3$ | $CH_3O\overset{O}{C}\overset{CN}{\underset{O}{-}}\overset{CN}{-}(CH_2)_{15}CH_3$<br>Methyl 2,5-dicyano-2-(n-heptadecyl)tetrahydro-5-furoate |
| $CH_2=CH_2$ | $CH_3O\overset{O}{\underset{CN}{C}}\overset{O}{-}\underset{CN}{C}C_6H_5$ | $CH_3O\overset{O}{C}\overset{CN}{\underset{O}{-}}\overset{CN}{-}C_6H_5$<br>Methyl 2,5-dicyano-2-phenyltetrahydro-5-furoate |
| $CH_2=CH_2$ | $CH_3(CH_2)_3O\overset{O}{\underset{CN}{C}}\overset{O}{-}\underset{CN}{C}-C_6H_4-Cl$ | $CH_3(CH_2)_3O\overset{O}{C}\overset{CN}{\underset{O}{-}}\overset{CN}{-}C_6H_4-Cl$<br>n-Butyl 2,5-dicyano-2-(p-chlorophenyl)tetrahydro-5-furoate |
| $CH_2=CH_2$ | $CH_3(CH_2)_7O\overset{O}{\underset{CN}{C}}\overset{O}{-}\underset{CN}{C}\overset{O}{C}O(CH_2)_7CH_3$ | $CH_3(CH_2)_7O\overset{O}{C}\overset{CN}{\underset{O}{-}}\overset{CN}{-}\overset{O}{C}O(CH_2)_7CH_3$<br>Di-(n-octyl)2,5-dicyanotetrahydro-2,5-furandicarboxylate |
| $CH_2=CH_2$ | $CH_3(CH_2)_{17}O\overset{O}{\underset{CN}{C}}\overset{O}{-}\underset{CN}{C}\overset{O}{C}O(CH_2)_{17}CH_3$ | $CH_3(CH_2)_{17}O\overset{O}{C}\overset{CN}{\underset{O}{-}}\overset{CN}{-}\overset{O}{C}O(CH_2)_{17}CH_3$<br>Di-(n-octadecyl)2,5-dicyanotetrahydro-2,5-furandicarboxylate |
| $CH_3CH=CHCH_3$ | $C_7F_{15}\underset{CN}{C}\overset{O}{-}\underset{CN}{C}C_7F_{15}$ | $C_7F_{15}\overset{CN}{\underset{H_3C}{-}}\overset{O}{-}\overset{CN}{\underset{CH_3}{-}}C_7F_{15}$<br>2,5-dicyano-3,4-dimethyl-2,5-di(perfluoroheptyl)tetrahydro-furan |
| $CH_2=CH_2$ | $C_{13}F_{27}\underset{CN}{C}\overset{O}{-}\underset{CN}{C}C_{13}F_{27}$ | $C_{13}F_{27}\overset{CN}{\underset{O}{-}}\overset{CN}{-}C_{13}F_{27}$<br>2,5-dicyano-2,5-di(perfluorotridecyl)tetrahydrofuran |
| $CH_2=CH-C\equiv CH$ | $NC\underset{CN}{C}\overset{O}{-}\underset{CN}{C}-C_{10}H_{21}$ | $(CN)_2\overset{O}{-}\overset{CN}{\underset{C\equiv CH}{-}}C_{10}H_{21}$<br>2-decyl-3-ethynyl-2,5,5-tricyanotetrahydrofuran |
| $CHI=CHI$ | $NC\underset{CN}{C}\overset{O}{-}\underset{CN}{C}-p-C_6H_4F$ | $(CN)_2\overset{O}{\underset{I}{-}}\overset{p-C_6H_4F}{\underset{CN}{-}}$<br>3,4-diiodo-2-p-fluorophenyl-2,5,5-tricyanotetrahydrofuran |
| $CH_2=CHCH_2CN$ | $(NC)_2C\overset{O}{-}C(CN)_2$ | $(NC)_2\overset{O}{-}(CN)_2$<br>$\underset{CH_2CN}{\|}$<br>3-cyanomethyl-2,2,5,5-tetracyanotetrahydrofuran |
| $CH_2=CH(CH_2)_8CN$ | $(NC)_2C\overset{O}{-}C(CN)_2$ | $(NC)_2\overset{O}{-}(CN)_2$<br>$\underset{(CH_2)_8CN}{\|}$<br>3-(ω-cyanooctyl)-2,2,5,5-tetracyanotetrahydrofuran |

TABLE I—Continued

| Unsaturated Reactant | Epoxide Reactant | Product |
|---|---|---|
| NCCH$_2$CH=CHCH$_2$CN | (NC)$_2$C—C(CN)$_2$ with O bridge | 3,4-di(cyanomethyl)-2,2,5,5-tetracyanotetrahydrofuran |
| CH$_2$=CHCH$_2$$\overset{O}{\overset{\|}{C}}$OCH(CH$_2$-CH$_2$)$_2$(cyclopentyl) | (NC)$_2$C—C(CN)$_2$ with O bridge | Cyclohexyl(2,2,5,5-tetracyanotetrahydro-3-furyl)acetate |
| CH$_2$=CH(CH$_2$)$_8$$\overset{O}{\overset{\|}{C}}$OCH$_2$C$_6$H$_5$ | (NC)$_2$C—C(CN)$_2$ with O bridge | Benzyl 9-(2,2,5,5-tetracyanotetrahydro-3-furyl)-1-nonanoate |
| CH$_3$(CH$_2$)$_7$CH=CH(CH$_2$)$_7$$\overset{O}{\overset{\|}{C}}$OCH$_3$ | (NC)$_2$C—C(CN)$_2$ with O bridge | Methyl 8-(4-octyl-2,2,5,5-tetracyanotetrahydro-3-furyl)-1-octoate |
| CH$_2$=CHCH$_2$OCH(CH$_2$-CH$_2$)$_2$ | (NC)$_2$C—C(CN)$_2$ with O bridge | 3-cyclopentyloxymethyl-2,2,5,5-tetracyanotetrahydrofuran |
| CH$_2$=CHCH$_2$OC$_{16}$H$_{33}$ | (NC)$_2$C—C(CN)$_2$ with O bridge | 3-hexadecyloxymethyl-2,2,5,5-tetracyanotetrahydrofuran |
| CH$_3$CH=CHCH$_2$O$\overset{O}{\overset{\|}{C}}$C$_7$H$_{15}$ | (NC)$_2$C—C(CN)$_2$ with O bridge | 4-methyl-3-octanoyloxymethyl-2,2,5,5-tetracyanotetrahydrofuran |
| CH$_2$=CHCH$_2$O$\overset{O}{\overset{\|}{C}}$C$_{15}$H$_{31}$ | (NC)$_2$C—C(CN)$_2$ with O bridge | 3-palmitoyloxymethyl-2,2,5,5-tetracyanotetrahydrofuran |

The following examples illustrate the preparation of polymeric compounds of this invention by reacting a polycyanoethylene oxide with an unsaturated homopolymer or copolymer.

EXAMPLE XXVIII

To a solution of 10 parts of polystyrene in 540 parts of 1,2-dibromoethane was added 13.8 parts of tetracyanoethylene oxide dissolved in about 100 parts of 1,2-dibromoethane. The mixture was stirred and heated to remove the solvent by distillation at atmospheric pressure (B.P. of 1,2-dibromoethane, 131.5° C.). The residual product was extracted with ethanol in a soxhlet apparatus. Analysis of the dried ethanol-insoluble product showed a nitrogen content corresponding to a reaction of 10 parts of polystyrene with 2.1 parts of tetracyanoethylene oxide.

*Analysis.*—Calc'd for 10/2.1 polystyrene/tetracyanoethylene oxide: C, 85.0; H, 6.36; N, 6.77. Found: C, 80.8; H, 6.49; N, 6.77.

EXAMPLE XXIX

A. A blend of 15 parts of xylene-soluble raw crepe rubber and 15.2 parts of tetracyanoethylene oxide was prepared on a rubber mill having heated rolls 6″ long by 2.5″ in diameter. The mixture was milled 10 minutes at 58° C., 4 minutes at 100° C. and 5 minutes at 105–110° C., and was then sheeted out. The sheeted product, after extraction with methanol for two weeks in a soxhlet apparatus, was found to be insoluble in xylene.

B. Blended mixtures of raw crepe rubber and tetracyanoethylene oxide were prepared on a rubber mill, molded sheets of the blends were made in a molding press under various conditions, tensile strength and elongation of the molded samples were determined, and elemental analyses were obtained. The data are presented in Table II.

TABLE II

| No. | TCNEO | T.,° C. | Min. | Tensile | Elong. | C | H | N |
|---|---|---|---|---|---|---|---|---|
| 1 | 0 | 120 | 60 | 2,157 | 1,219 | | | |
| 2 | 0 | 140 | 30 | 1,908 | 1,159 | | | |
| 3 | 0 | 150 | 15 | 1,474 | 1,010 | | | |
| 4 | 2.9 | 100 | 30 | 142 | 622 | | | |
| 5 | 2.9 | 120 | 30 | 102 | 559 | | | |
| 6 | 2.9 | 120 | 60 | | | 87.2 / 83.8 | 11.5 / 11.3 | 1.13—Calc'd. / 1.29—Found. |
| 7 | 2.9 | 140 | 30 | 80 | 427 | | | |
| 8 | 11.1 | 120 | 60 | 236 | 94 | | | |
| 9 | 11.1 | 140 | 30 | 264 | 99 | | | |
| 10 | 11.1 | 150 | 30 | | | 84.0 / 82.4 | 10.5 / 10.4 | 4.32—Calc'd. / 3.92—Found. |
| 11 | 20 | 120 | 60 | 811 | 57 | | | |
| 12 | 20 | 140 | 30 | 765 | 50 | | | |
| 13 | 20 | 150 | 30 | | | 80.6 / 77.1 | 9.45 / 9.02 | 7.78—Calc'd. / 7.11—Found. |

TCNEO = percent tetracyanoethylene oxide blended
T.,° C. = molding temperature in degrees centigrade
Min. = molding time in minutes
Tensile = tensile strength in lbs. per sq. in. of cross-section
Elong. = percent elongation at break
C, H, N = percent carbon, hydrogen and nitrogen, respectively

EXAMPLE XXX

A. A blend of 25 parts of xylene-soluble polychloroprene and 40.6 parts of tetracyanoethylene oxide was prepared on a rubber mill having heated rolls 6″ long by 2.5″ in diameter. The mixture was milled 32 minutes at 50° C. and 15 minutes at 105–110° C., and was sheeted out at 60° C. The sheeted product, after extraction with methanol for two weeks in a soxhlet apparatus, was found to be insoluble in xylene.

B. Blended mixtures of polychloroprene and tetracyanoethylene oxide was prepared at 50° C. on a rubber mill and tested, as in Example XXIX–B. The data thus obtained are presented in Table III.

TABLE III
[The column headings are the same as in Table II.]

| No. | TCNEO | T.,° C. | Min. | Tensile | Elong. | C | H | N |
|---|---|---|---|---|---|---|---|---|
| 1 | 2.9 | 100 | 30 | 1,115 | 771 | | | |
| 2 | 2.9 | 100 | 60 | | | 54.1 / 53.6 | 5.49 / 5.6 | 1.13—Calc'd. / 0.70—Found. |
| 3 | 2.9 | 120 | 30 | 887 | 694 | | | |
| 4 | 2.9 | 120 | 60 | 875 | 607 | | | |
| 5 | 11.1 | 140 | 30 | | | 53.9 / 53.4 | 5.03 / 5.37 | 4.33—Calc'd. / 3.22—Found. |
| 6 | 11.1 | 150 | 15 | 296 | 170 | | | |
| 7 | 11.1 | 150 | 30 | 382 | 221 | | | |
| 8 | 20 | 120 | 60 | 1,586 | 166 | | | |
| 9 | 20 | 150 | 30 | 1,929 | 98 | 53.4 / 52.6 | 4.52 / 4.86 | 7.78—Calc'd. / 5.98—Found. |

Halohydrocarbon polymers in addition to polychloroprene can be reacted according to the process of this invention. For example, polybromoprene (polymeric 2-bromo-1,3-butadiene) and poly-2,3-difluorobutadiene (polymeric 2,3-difluoro-1,3-butadiene) can be reacted with a tetracyanoethylene oxide by following the procedure of Example XXX–B to yield modified polymers containing tetrahydrofuran units and having higher melting points and lower solubility than their respective parent polymers.

EXAMPLE XXXI

An elastomeric copolymer was prepared from 8 parts of ethylene and 10 parts of 1,5-hexadiene at −20° C. with a vanadyl trichloride-titanium tetraphenoxide-diethylaluminum chloride catalyst. The polymer contained about 25% hexadiene units (estimated by infrared spectroscopic analysis), and had an inherent viscosity of 1.47 at 0.1% concentration in α-chloronaphthalene at 125° C. A solution of 3.3 parts of the copolymer (containing the equivalent of 0.02 mole of vinyl side groups) and 2.9 parts (0.02 mole) of tetracyanoethylene oxide in 110 parts of chlorobenzene was heated at reflux for two hours. The reaction mixture was then cooled and poured into excess ethanol to precipitate the polymeric material, which was separated, washed successively with ethanol, acetone, and ethanol, and dried under reduced pressure. The resultant 3.5 parts of material was elastomeric and could be melt-pressed at 125° C. to a tough, clear film. Infrared spectroscopic analysis of the product showed a lack of absorption due to vinyl groups (found in the original copolymer at 910, 990 and 1642 cm.$^{-1}$), a moderately strong sharp absorption at 2250 cm.$^{-1}$ indicative of cyano groups, and broad bands centered at 1010, 1070 and 1220 cm.$^{-1}$ which are believed to be indicative of the tetrahydrofuran structure. The product was found to be insoluble in α-chloronaphthalene at 125° C., and pressed films were found qualitatively tougher than films of the original copolymer. Elementary analysis showed 4.8% nitrogen.

EXAMPLE XXXII

A. A solution of one part of a butadiene/styrene copolymer having a 26% butadiene content and 0.55 part of tetracyanoethylene oxide in 55 parts of chlorobenzene was heated at reflux for three hours. The cloudy reaction mixture was cooled and poured into an excess of ethanol. A polymeric solid was precipitated which was washed successively with acetone and ethanol. The solid was found to be swollen but insoluble in acetone, and additional tests showed it to be insoluble in a variety of polar and non-polar solvents.

B. A butadiene/acrylonitrile copolymer having an 82% butadiene content was treated with tetracyanoethylene oxide by the procedure described under A, above. The resultant product was likewise insolubilized.

EXAMPLE XXXIII

A gummy elastomeric polymer was prepared from 5 volume of trans-trans-2,4-hexadiene in 50 volumes of chlorobenzene at −30° C. with a vanadyl trichloride-diethyl-aluminum chloride catalyst. A solution of 1.9 parts of the polymer in 55 parts of chlorobenzene was heated to 100° C., and 1.44 parts of tetracyanoethylene oxide was added. The reaction mixture was heated at reflux for 8 hours, and was then cooled and diluted with excess ethanol. The resultant precipitate was washed with ethanol and dried under reduced pressure. The product was dark in color and partially insoluble in tetrahydrofuran, but the soluble portion could be cast to a dark, clear, brittle film. Infrared spectroscopic analysis showed that the treated polymer contained about 50% less trans unsaturation than the untreated polymer; and the presence in the treated polymer of bands at 1010, 1070 and 2250 cm.$^{-1}$ showed the presence of the tetracyanotetrahydrofuran grouping.

Non-polymeric polycyanotetrahydrofurans are useful as intermediates to corresponding carboxylic acids, amides or esters, obtainable by well-known methods of hydrolysis or alcoholysis. Lower alkyl esters derived by alcoholysis are useful as solvents, and as plasticizers. Tetracarboxylic acids thus obtained from 2,2,5,5-tetracyanotetrahydrofurans have two malonic acid centers which can each lose carbon dioxide by decarboxylation, and thereby in turn yield corresponding dicarboxylic acids. These various polyfunctional carboxylic acids, amides and esters are useful further in the preparation of condensation polymers such as polyamides, by reaction under dehydrating conditions of the free acids with diamines, e.g., hexamethylene diamine, or polyesters, by poly-esterification of the acids or ester interchange of the esters with glycols, e.g., ethylene glycol. Polyamides and polyesters thus obtained from useful self-supporting films and fibers.

Polycyanotetrahydrofuran - substituted polymers obtained by reaction of polycyanoethylene oxides with poly-unsaturated polymers have generally higher melting points and lower solubility than the parent polymers and can be used as higher melting, solvent resistant embodiments thereof, e.g., in the form of waxes, films or plastic objects according to the nature of the precursor polymer.

The foregoing detailed description has been given for clarity of understanding only and no unnecessary limitations are to be understood therefrom. The invention is not limited to the exact details shown and described for obvious modification will be apparent to those skilled in the art.

The embodiments of the invention in which an exclusive property or privilege is claimed are defined as follows:

1. 4,7-dimethyl-1,1,3,3-tetracyano-1,3,3a,7a-tetrahydroisobenzofuran.
2. 1,1,3,3-tetracyano-1,3,3a,7a-tetrahydroisobenzofuran.
3. 2,2,5,5-tetracyanotetrahydrofuran.
4. 3-acetoxy-2,2,5,5-tetracyanotetrahydrofuran.
5. 3-fluoro-2,2,5,5-tetracyanotetrahydrofuran.
6. 3-methyl-2,2,5,5-tetracyanotetrahydrofuran.
7. 3-methylene-2,2,5,5-tetracyanotetrahydrofuran.
8. 1,1,3,3 - tetracyano - 1,3,3a,4,5,6,7,7a - octahydroisobenzofuran.
9. A process for preparing the compounds of claim 12 which comprises contacting a polycyanoethylene oxide of the formula

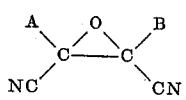

with an ethylenically unsaturated compound of the formula

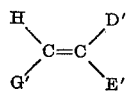

at a temperature of about 80–250° C., A, B, D′, E′, G′ and H being as defined in claim 12.

10. The process of claim 9 wherein the temperature is about 100°–200° C.
11. The process of claim 9 wherein the mole ratio of polycyanoethylene oxide to ethylenically unsaturated compound is up to about 1:1.
12. A compound of the formula

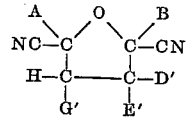

wherein
A is of the group consisting of hydrogen, cyano, R, RO(O)C—, polyfluoro R and p-XH$_4$C$_6$—, R being alkyl of 1–18 carbons and X being of the group consisting of hydrogen, halogen, nitro, R and RO—;
B is of the group consisting of cyano, —C(O)OR and polyfluoro R;
at least one of D′, E′ and G′ is hydrogen;
each of D′ and G′ contains upon to 18 carbon and is of the group consisting of hydrogen, halogen, R′ wherein R is selected from alkyl, phenyl, cycloalkyl, alkynyl, phenylalkyl, alkphenyl, phenylcycloalkyl, cycloalkylphenyl, alkcycloalkyl, cycloalkylalkyl, alkenyl, cycloalkenyl and phenylalkynyl, halo R′ in which all halogens are of atomic number 9–35 and cyano R′;
E′ contains up to 18 carbons and is of the group consisting of D′, alkenyl (R‴), halo R‴ in which all halogens are of atomic number 9–35, —C≡CR′, —C≡CH, cyano, —O(O)CR′, —CH$_2$O(O)CR′, —CH$_2$OR′, —C(O)OR′, —(CH$_2$)$_{1-8}$—C(O)OR′, —CH(lower-alkoxy)$_2$, polyfluoroalkylthio of 1–7 carbons and a moiety of the formula

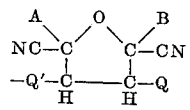

Q being of the group consisting of hydrogen and alkyl of 1–7 carbons and Q′ being alkylene of 1–7 carbons;
H is hydrogen;
D′ and E′ conjointly are exomethylene; and
E′ and G′ conjointly form, with the depicted carbons, a cyclic compound in which any unsaturation is both intracyclic and ethylenic, the (—G′—E′—) segment of said compound being of the group consisting of divalent radicals (R″) containing 2–12 carbons selected from alkylene, phenylene, alkynylene, cycloalkylene, phenylalkylene, phenylcycloalkylene, alkphenylene, alkcycloalkylene, cycloalkylalkylene, cycloalkylphenylene, alkenylene, cycloalkenylene and phenylalkynylene, halo R″ in which all halogens are of atomic number 9–35, oxyvinylene, thiovinylene and oxy(halovinylene) and thio(halovinylene) in which the halogen is of atomic number 17–35.

References Cited by the Examiner

UNITED STATES PATENTS

| | | | |
|---|---|---|---|
| 2,570,028 | 10/1951 | Dunlop et al. | 260—88.5 |
| 2,698,319 | 12/1954 | Brown et al. | 260—88.5 |
| 2,918,479 | 12/1959 | Seffl | 260—346.1 |
| 3,060,198 | 10/1962 | Weis | 260—346.1 |

NICHOLAS S. RIZZO, *Primary Examiner.*

HENRY JILES, *Assistant Examiner.*

UNITED STATES PATENT OFFICE
CERTIFICATE OF CORRECTION

Patent No. 3,317,567  
May 2, 1967

William J. Linn

It is hereby certified that error appears in the above numbered patent requiring correction and that the said Letters Patent should read as corrected below.

Column 26, line 23, for "upon" read -- up to --; same line 23, for "carbon" read -- carbons --; line 25, for "R" read -- R′ --.

Signed and sealed this 21st day of November 1967.

(SEAL)  
Attest:

Edward M. Fletcher, Jr.  
Attesting Officer

EDWARD J. BRENNER  
Commissioner of Patents